(12) United States Patent
Dani et al.

(10) Patent No.: US 7,750,589 B2
(45) Date of Patent: Jul. 6, 2010

(54) METHOD FOR CONTROLLING THE ANGULAR POSITION OF A STEPPER MOTOR

(75) Inventors: Alain Dani, Coburg (DE); Florent Davier, Saint Maur des Fosses (FR)

(73) Assignee: Valeo Systemes Thermiques, Le Mesnil Saint Denis Cedex (FR)

( * ) Notice: Subject to any disclaimer, the term of this patent is extended or adjusted under 35 U.S.C. 154(b) by 402 days.

(21) Appl. No.: 11/818,417

(22) Filed: Jun. 14, 2007

(65) Prior Publication Data

US 2008/0018286 A1    Jan. 24, 2008

(30) Foreign Application Priority Data

Jul. 24, 2006    (FR)    ................... 06 06733

(51) Int. Cl.
*H02P 3/00* (2006.01)
*H02H 3/24* (2006.01)

(52) U.S. Cl. .................. 318/466; 318/444; 318/467; 318/685; 318/696

(58) Field of Classification Search ................. 318/473, 318/490, 567, 590, 685, 696, 578, 444, 466, 318/467, 449
See application file for complete search history.

(56) References Cited

U.S. PATENT DOCUMENTS

| | | | | | |
|---|---|---|---|---|---|
| 3,776,200 | A | * | 12/1973 | Tine et al. | .................. 122/504 |
| 4,006,393 | A | * | 2/1977 | Westley | ...................... 318/473 |
| 4,458,187 | A | * | 7/1984 | Heiman | ...................... 318/490 |
| 4,760,318 | A | * | 7/1988 | Jones | .......................... 318/362 |
| 4,789,834 | A | * | 12/1988 | Koopman | .................. 324/417 |
| 5,113,124 | A | * | 5/1992 | Hamilton et al. | ............ 318/578 |
| 2005/0151499 | A1 | | 7/2005 | Koide et al. | |

FOREIGN PATENT DOCUMENTS

| | | |
|---|---|---|
| DE | 196 02 371 A | 7/1997 |
| JP | 09 222903 A | 8/1997 |
| WO | WO93/25808 A | 12/1993 |

* cited by examiner

*Primary Examiner*—Paul Ip
(74) *Attorney, Agent, or Firm*—Howard & Howard Attorneys PLLC

(57) ABSTRACT

The invention relates to a method for controlling the angular position [STP_POS] of a stopless rotatably movable member [1] of a stepper motor, the said movable member [1] being designed to interact with at least one fixed member [2] whose state is capable of being modified during the rotation of the movable member [1] according to parameters [CAM_POS] previously defined according to the angular position [STP_POS] of the movable member [1]. The method comprises a step of testing the correspondence [18] of the state of the fixed member [2] with the parameters [CAM_POS] of the predefined modifications, in a mode in which the position of the motor [STP_POS] is considered to be defined.

20 Claims, 2 Drawing Sheets

METHOD FOR CONTROLLING THE ANGULAR POSITION OF A STEPPER MOTOR

BACKGROUND OF THE INVENTION

The present invention relates to the general field of stepper motors and of the methods for controlling the position of such motors.

In particular, such motors, operating in a rotary movement, are used to command the movements of the distribution shutters in the heating, ventilation and air conditioning systems of motor vehicles, often called HVAC systems.

As is known, stepper motors move the air distribution shutters between two extreme positions in which stops limit the movement of this movable member. The position of the motor is then checked relative to the stops.

This operation generally gives satisfaction. However, it has been noted that errors of position of the motor are easily introduced during blocking events. In particular, it is necessary to carry out a blocking of several motor steps on the stops in order to locate them. The final position is therefore not sure and the locating procedure may be relatively long which is very often detrimental. Errors of rotational direction are also observed without it being possible to detect them.

In addition, these stepper motors do not make it possible to determine a shorter path from one position to another because, to go from one point to another, it may be necessary to make a virtually complete revolution.

OBJECT AND SUMMARY OF THE INVENTION

The main object of the present invention is therefore to alleviate such disadvantages by proposing a method for controlling the angular position of a stepper motor comprising a stopless rotatably movable member.

More particularly, the invention relates to a method for controlling the angular position of a stopless rotatably movable member of a stepper motor, the said movable member being designed to interact with at least one fixed member whose state is capable of being modified during the rotation of the movable member according to parameters previously defined according to the angular position of the movable member. The method according to the invention comprises a step of testing the correspondence of the state of the fixed member with the parameters of the predefined modifications, in a mode in which the position of the motor is considered to be defined.

With such a method, it becomes possible to control the angular position of a stopless stepper motor thereby avoiding all the problems of forcing, in particular on the stops. The method therefore makes it possible to use a stopless rotation. It then becomes possible to control a rotary movement by calculating a shorter path between two angular positions.

According to a particular feature, the method according to the invention also comprises a verification step, initiated when the correspondence test is negative, during which at least one complete revolution of the movable member is completed in order to verify the occurrence of the modifications of the state of the fixed member according to the parameters previously defined according to the position of the movable member.

With such a feature, the invention makes it possible to detect one or more anomalies of operation on a complete revolution of the movable member. This feature makes it possible to confirm or invalidate a negative correspondence test.

According to another particular feature, the method also comprises a step of deciding to place the motor in a normal mode when the correspondence test is positive or when the verification is correct or in a relative mode in which the position of the motor is determined relative to the position in which it is at the end of the verification step when the verification is incorrect.

Since the position control is based on monitoring the state of the fixed member, this feature makes it possible to use this state to modify the operation of the motor.

According to another feature, the method comprises a step of signaling the transition to relative mode on a man-machine interface.

Therefore, any anomalies are signaled, for example, to an operator.

According to one feature of the invention, the method includes a step of recording, in a non-volatile memory, the decision to pass to relative mode with the result of the verification step.

Such a feature makes it possible to retain parameters associated with the transition to relative mode, for example the time when it took place. A log of the events is then available. In the motor vehicle application, such a log is useful for the garage mechanic who then has access to the various failures and anomalies. Other parameters measured at this time may also be recorded.

According to a particular feature, the result of the verification step makes it possible to distinguish a fault due to the fixed member from a fault due to the movable member.

In particular, it is of value to have such information in the events log for subsequent repairs. The invention therefore makes it possible to optimize the diagnosis of a failure of the stepper motor.

According to another feature, in normal mode, when the correspondence test is negative, and a decision to pass to relative mode has been recorded in the non-volatile memory, a calibration step is initiated, during which at least one complete revolution of the movable member is completed during which parameters of the modifications of the state of the fixed member are recorded.

Because a transition to relative mode has been recorded, when the correspondence test is found to be negative, a simple verification phase will usually again be incorrect. There is therefore no point in carrying out a simple verification. In this case, it is worthwhile redefining the parameters of the modifications of the state of the fixed member. This is the function of the calibration step.

According to other features, in relative mode, the method includes a step of receiving a request for the deletion of the result of the verification step stipulating a fault of the movable member, a step of deleting the fault of the movable member from the non-volatile memory, this deletion step causing the initiation of a calibration step, during which at least one complete revolution of the movable member is completed during which parameters of the modifications of the state of the fixed member are recorded.

The method may also include, in relative mode, a step of receiving a request for the deletion of the result of the verification step stipulating a fault of the fixed member, a step of deleting the fault of the fixed member, this deletion step causing the initiation of a calibration step or of a verification step depending on whether or not a record of a fault of the movable member is present.

The latter features make it possible to command a reinitialization of the motor by recording of the parameters of the modifications of the state of the fixed member when an external user requests the deletion of the events that have led to the transition to relative mode. The external control of the events log concerning the stepper motor according to the invention therefore initiates a reaction of the method which reinitializes via a calibration.

In an advantageous embodiment, the parameters of the modifications of the state of the fixed member are previously defined in a previous calibration step during which at least one complete revolution of the movable member is completed during which parameters of the modifications of the state of the fixed member are recorded.

Such a preliminary calibration step is initiated when no modification feature of the state of the fixed member is recorded in the non-volatile memory. It makes it possible to initialize the method when the latter is launched for a first time.

The method may also include a step of receiving an external request to initiate a calibration step, during which at least one complete revolution of the movable member is completed during which parameters of the modifications of the state of the fixed member are recorded.

Such a feature allows a garage mechanic, for example, to initiate a calibration of the motor at any time.

According to an advantageous embodiment, the correspondence test is run when a modification of the state of the fixed member is expected in view of the predefined parameters or when the motor is stopped.

This embodiment makes it possible to economize the software resources that apply the method and is sufficient to carry out a satisfactory control of the position of the motor.

Advantageously, the parameters of the modifications of the state of the fixed member are such that they make it possible to define the direction of rotation of the movable member.

This involves having interaction between the fixed member and the movable member so that the parameters of the modifications of the state of the fixed member are distinct in one direction of rotation and in the other. During the correspondence test, then during the initiated verification step, the invention makes it possible to easily detect such a fault.

In particular, the invention relates to a method for which, the state of the fixed member being able to be modified between two states, the parameters of the modifications include, with reference to the angular origin, numbers of steps or percentages of the circumference corresponding to two modifications from the first state to the second state, the numbers of steps or the percentages of the circumference corresponding to two modifications from the second state to the first state, modifications due to the presence of two cams of a length in number of different steps on the movable member.

Such an embodiment has the advantage of being particularly robust and suited to the conditions, particularly the heat and vibration conditions, of the motor vehicle environment while having the advantages of the stopless rotational operation.

The invention also relates to a stepper motor comprising a control unit, a motor block and a stopless rotatably movable member and is designed to interact with at least one fixed member whose state is capable of being modified during the rotation of the movable member, characterized in that the control unit is capable of using a method according to the invention.

Advantageously, the motor is such that the rotatably movable member supports two cams of different sizes in number of steps of the motor.

In one embodiment, the fixed member is a pushbutton contactor.

The invention also relates to a motor vehicle fitted with a device for actuating a ventilation/air conditioning shutter comprising a stepper motor according to the invention.

According to a preferred implementation, the various steps of the method are determined by code instructions of computer programs.

Consequently, a further subject of the invention is a computer program on an information medium, this program being capable of being used in a control unit of a stepper motor according to the invention, this program comprising code instructions suitable for applying the steps of a method according to the invention.

This program may use any programming language, and be in the form of source code, object code, or intermediate code between source code and object code, such as in a partially compiled form, or in any other desirable form.

A further subject of the invention is an information medium that can be read by a control unit of a stepper motor and that comprises code instructions of a computer program as mentioned above.

The information medium may be any entity or device capable of storing the program. For example, the medium may comprise a storage means, such as a ROM, for example a microelectronic circuit ROM, or else a magnetic recording means, for example a hard disk.

Alternatively, the information medium may be an integrated circuit in which the program is incorporated, the circuit being suitable for executing, or being used in the execution of, the method in question.

BRIEF DESCRIPTION OF THE DRAWINGS

Other features and advantages of the present invention will emerge from the description made below, with reference to the appended drawings which illustrate an exemplary embodiment thereof containing no limiting character. In the figures.

DETAILED DESCRIPTION OF AN EMBODIMENT

Figure 1:
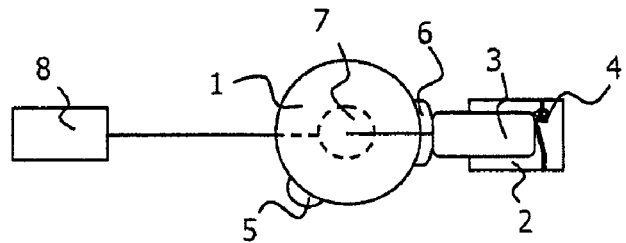
FIG. 1 is a schematic representation of a stepper motor in which a position control method according to the invention is applied.

FIG. 1 gives an exemplary embodiment of a stepper motor applying a position control method according to the invention.

This motor comprises a stopless rotatably movable member 1. "Stopless rotation" means the ability to rotate 360° in one direction or the other an indefinite number of times.

According to the example of FIG. 1, the movable member 1 is able to interact with a fixed member 2. In the proposed example, the fixed member 2 is a contactor comprising a pushbutton 3 capable of generating a contact on a switch 4.

In the proposed exemplary embodiment, in order to interact with the fixed member 2, the movable member 1 supports two cams 5 and 6 of different lengths that is to say extending over a different angular length. They therefore have different sizes in number of steps of the motor.

The cams 5 and 6 are capable of interacting with the fixed member 2 whose state is capable of being modified by the passage of the cams 5 and 6 during the rotation of the movable member 1.

To be set in rotation, the movable member 1 is connected to a motor block 7 itself connected to a control unit 8 of the motor block 7. The position control method is applied in the control unit 8 and controls the position of the movable member 1.

Such a stepper motor is, for example, used to command shutters of a heating, ventilation and air conditioning device in a vehicle.

Figure 2:
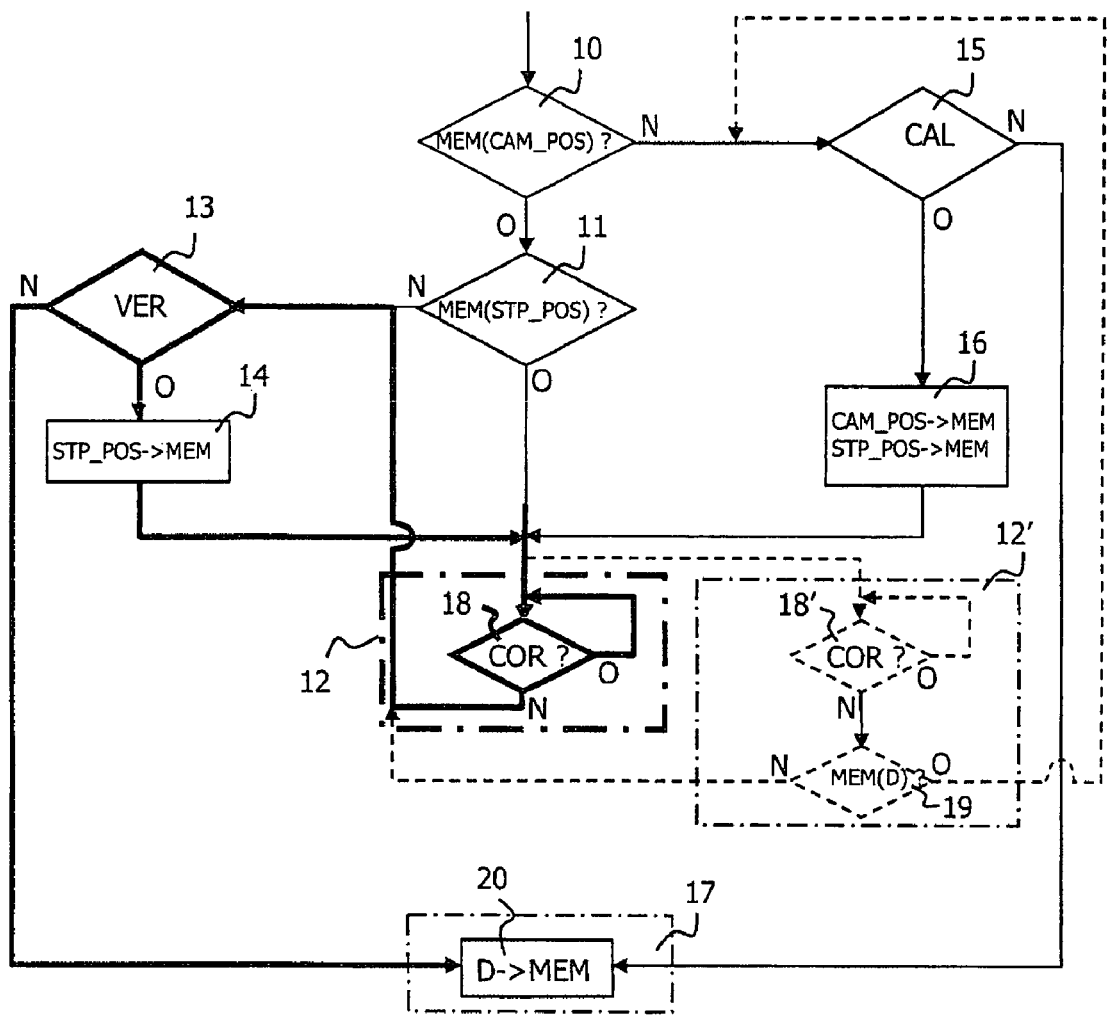
FIG. 2 is a flowchart illustrating the various steps of the position control method according to the invention.

FIG. 2 is a flowchart describing a preferred embodiment of a method of controlling the angular position of a movable member of the stepper motor of FIG. 1.

The actual invention will be described essentially with respect to the portion of the flowchart represented in bold lines, the function of the invention being to control the position of the movable member 1 of the motor.

The position control method according to the invention requires that parameters CAM_POS of the modifications of the state of the fixed member 2, when the movable member 1 makes a complete revolution, are previously defined. These parameters CAM_POS associate each angular position of the movable member 1 with a state of the fixed member 2. The state of the fixed member 2 corresponds to the presence or absence of a cam at the level of the fixed member 2 in the given angular position. Consequently, the parameters CAM_POS in fact give the angular position of the cams.

According to the method, the position of the movable member 1 is considered to be defined and an angular value STP_POS is therefore attached thereto. Such an angular value STP_POS may be a number of steps modulo the number of total steps in order to make a complete revolution or else a percentage going from 0% to 100% for the angles going from 0° to 360°. So, the parameters CAM_POS may therefore be defined as a set of angular positions, each associated with a state of the fixed member 2, and marked relative to the same origin as the angular value STP_POS.

The first step of the position control method consists in a correspondence test 18 during which the state of the fixed member 2 is compared with the previously defined parameters CAM_POS for the position STP_POS in which the movable member 1 finds itself.

Advantageously, the correspondence test 18 takes place when the motor stops or each time a change of state of the fixed member 2 is expected according to the characteristic CAM_POS previously defined for the angular position STP_POS in question. It is also possible but relatively costly in resources of the system to run the correspondence test 18 permanently that is to say also during movements of the motor for which no modification of the state of the fixed member 2 is expected.

As an output of the correspondence test 18, two cases may occur. In a first case, case O in FIG. 2, the state of the fixed member 2 corresponds to the previously defined parameters CAM_POS. In this case, no specific action is taken, the correspondence test 18 is looped on itself for the next movements of the movable member 1 and the normal mode 12 remains activated. The method continues with the activation of a new correspondence test 18 during a next stop of the motor or a next expected modification of the state of the fixed member 2.

In a second case (case N), the state of the fixed member 2 does not correspond to the previously defined parameters CAM_POS, the correspondence test 18 is then negative.

A verification step 13 is then carried out during which a complete revolution of the movable member 1 is made and during which the states of the fixed member 2 are compared with the predefined parameters CAM_POS.

FIG. 3 illustrates such a verification step 13. As illustrated in FIG. 3a, the movable member 1 is then brought to a previously defined position as being the zero of the 360° rotation of the movable member 1 relative to the fixed member 2.

In the example proposed in FIGS. 3a to 3f, the zero has been defined as the middle of the larger cam, namely cam 6. When the movable member 1 is in this position, the pushbutton 3 is pressed and causes a contact on the switch 4. This contact defines the state of the fixed member 2. The presence of this contact is signaled to the control unit 8 of the motor at the same time as the position of the movable member 1, here zero.

Figure 3A:
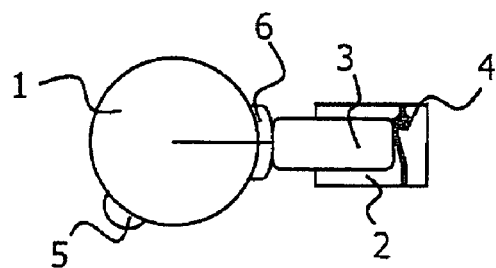
FIGS. 3a to 3f illustrate the operation of the stepper motor of FIG. 1 during a verification or calibration step of the method according to the invention.
Figure 3B:
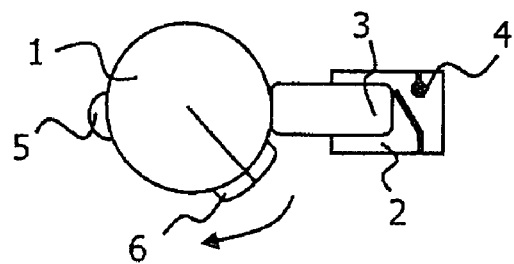

The movable member 1 is then set in rotation as illustrated in FIG. 3b by means of the motor block 7 commanded by the control unit 8. The cam 5 then moves and leaves the pushbutton 3 which then releases the contact on the switch 4. The state of the fixed member 2 is therefore modified. The cessation of the contact is signaled to the control unit 8 at the same time as the position of the movable member 1 observed at that moment. For example, a number of steps corresponding to the number of steps made by the motor at that moment will then be signaled to the control unit 8. As has been seen above, other magnitudes may be used to quantify the position of the movable member 1, particularly a percentage.

Figure 3C:
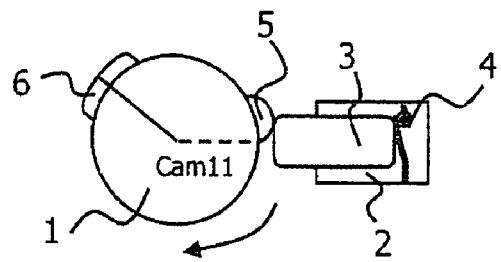

As shown in FIG. 3c, the cam 5 then arrives facing the pushbutton 3 and again causes the contact on the switch 4. The occurrence of this contact and the number of steps made from the zero before this contact is indicated to the control unit 8.

Figure 3D:
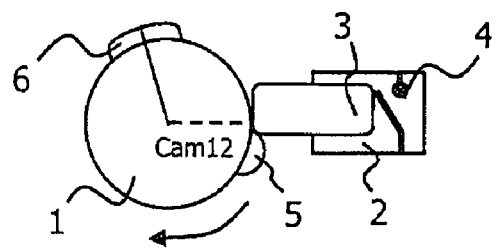

Then, as shown in FIG. 3d, the rotation of the movable member 1 continues and the cam 5 leaves the pushbutton 3, generating a cessation of the contact on the switch 4. Again, the cessation of the contact and the number of steps necessary to obtain it are indicated to the control unit 8 which records them.

Figure 3E:
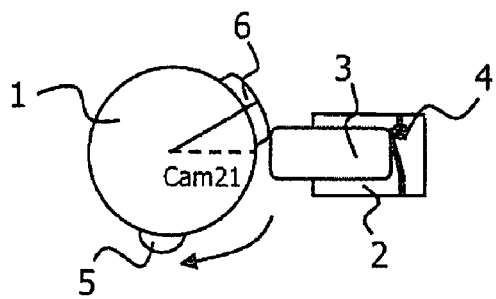
Figure 3F:
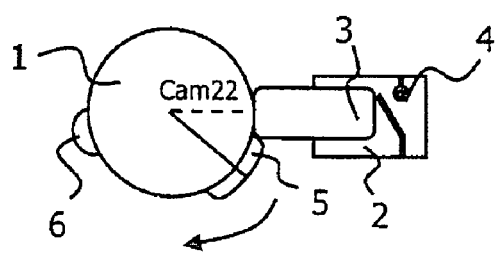

Then, the cam 5 is brought facing the pushbutton 3, according to FIG. 3e and generates another contact. This contact and the number of steps necessary to obtain this new contact are then signaled to the control unit 8 which records them.

Where necessary, as shown in FIG. 3f, the rotation of the movable member 1 is continued until the cam 5 again leaves the pushbutton 3.

Throughout the verification step described above, the presence or absence of contact on the fixed member 2 associated with the position STP_POS of the movable member 1 are compared with the previously defined parameters CAM_POS.

Several cases may be encountered here.

If the state of the fixed member 2 is indeed modified according to the predefined parameters CAM_POS, the verification step 13 is successful and the normal mode is reinstated (case O in FIG. 2).

Otherwise, in the case N, the stepper motor is switched to a relative mode 17 in which the rotation of the motor may be commanded blind, for example by a user, but in which the position is not guaranteed. The stepper motor may then be set in motion only in a manner relative to the last position it was in at the end of the verification step.

Where necessary, when a value STP_POS was stored in memory before the verification step resulting in a failure, the motor is referenced, for the subsequent movements in relative mode, relative to this position STP_POS, considered to be exact.

Such a transition to relative mode 17 is signaled on a man-machine interface so as to indicate that a service or a repair is necessary.

According to an advantageous feature of the invention, it is possible to store, in a step 20, the occurrence of a fault, marked D in FIG. 2, in a non-volatile memory MEM. A faults log may then be produced with the time the fault occurred and the action generated. It is also possible, according to the invention, to qualify the nature of the fault D in the memory MEM.

Therefore, in an advantageous embodiment, the verification step 13 is capable of distinguishing between several types of faults D. The log then also preserves the type of faults encountered and causing the failure of the verification step 13.

A first distinction exists between the faults relating to the movable member 1 and those relating to the fixed member 2. Advantageously, the recording of a fault, for example relating to the fixed member 2, amounts to giving a value qualifying the nature of the fault of the fixed member to a register of the memory MEM dedicated to storing the faults of the fixed member.

Therefore, if it is observed that the switch 4 remains permanently pressed, a value, for example UBAT, battery voltage, is stored in the register in which the faults relating to the fixed member are stored.

If, on the contrary, it is observed that the switch is permanently grounded, then the stored value may be taken to be equal to ground GND.

If the cams 5 and 6 appear during the verification but with associated positions of the movable member 1 that are different from those stored in the predefined parameters, a rotation in the reverse direction may then be detected. A value signaling the "reverse rotation" fault is then stored in the register dedicated to the faults of the movable member 1.

Similarly, if it is observed that the movable member 1 has only one cam instead of two, a value chosen to signal the "one cam only" fault is stored in the register dedicated to the faults of the movable member.

Otherwise, for example, the registers store a null value signaling that there is no fault.

The fault log may be used according to certain advantageous features of the invention.

There follows a description of the whole preferred embodiment as illustrated in FIG. 2 which describes a position control method beginning from the starting of the vehicle.

When the vehicle starts, the control unit 8 first verifies, during a step 10, that the previously defined parameters CAM_POS for the modifications of the state of the fixed member 2 are stored in a non-volatile memory MEM.

When a stepper motor as described in FIG. 1 is used, the predefined parameters CAM_POS are the positions of the two cams 5 and 6 from a predefined origin or zero. In the example of FIG. 3, the middle of the larger cam, that is to say cam 5, is chosen to be zero.

When the memory MEM contains these predefined parameters, the control unit 8 then verifies, in a step 11, that a last position STP_POS of the stepper motor is stored in the memory MEM. If this last position STP_POS is stored, the method switches the stepper motor to normal mode 12 in which the position of the motor is then, before any movement command, the last position STP_POS.

If this last position STP_POS is not stored in the memory MEM, the method then carries out a verification step 13 during which the movable member 1 makes at least one complete revolution.

In the case O of the verification step, the two cams 5 and 6 are then detected by the fixed member 2 and, when, at the end of the revolution, the movable member is again in its starting position, this position STP_POS may be located relative to the two cams 5 and 6. It is then stored in memory MEM during a step 14 and the motor is switched to normal mode 12 in which the position STP_POS of the motor is known before any movement command. Alternatively, during this definition of the position STP_POS, it is possible to choose a zero, for example, as previously seen, in the middle of the larger cam.

When, during the step 10, the positions of the cams are not stored in memory, a calibration step 15 is carried out. This calibration step 15 is similar to the verification step described in detail above with reference to FIG. 2, except that the movable member 1 is not placed so as to be on the zero at the beginning of the process but placed randomly.

Provision may be made for the calibration to start only when the switch 4 is open, a situation for example caused by a rotation of the motor until it is obtained.

In an exemplary embodiment, a complete revolution is made in 7200 steps, the two cams are 3400 steps apart, the larger cam has an angular length equivalent to 800 steps and the smaller cam has an angular length equivalent to 400 steps.

During a calibration 15, the movable member 1 begins to revolve, for example from a position in which the fixed member is such that the contact is released, then encounters a first change of state of the fixed member 2, for example the beginning of the small cam 5, marked Cam11 in FIG. 3, an intermediate zero is then taken as being the angular position in which this change of state took place.

The other changes of state Cam12, Cam11, Cam12 are located relative to this zero. Once the positions of the cams are found, the pairs Cam11, Cam12 and Cam21, Cam22 are each associated with one of the cams 5 and 6 and their positions are advantageously recomputed relative to the middle of the large cam 6.

The cam positions CAM_POS are then recorded in memory MEM in a step 16. During this step 16, the position STP_POS of the movable member 1 is also located, initialized and recorded.

Note here that it is possible, because the cams are not at identical distances for the two directions of rotation, to detect that the direction of rotation has been reversed.

For example, before any movement command, the movable member 1 is placed on the zero of its circumferential movement, here, for example, in the middle of the larger cam 5.

The position STP_POS of the movable member 1 is also recorded as then being null. The motor is then switched to normal mode 12.

When the calibration step 15 does not turn out satisfactorily, that is to say, in the example, in a definition of the predefined parameters of the modifications of the state of the fixed member 2, the motor is then switched to relative mode 17.

Here also, the transition to relative mode and a fault D having caused it is then advantageously stored in the memory MEM. In a manner similar to that which was described for the verification step, it is also possible to qualify the faults and therefore store a value associated with the nature of the fault D.

The preferred embodiment described in FIG. 2 is such that, on each startup, when the data CAM_POS and STP_POS are available, the motor switches to normal mode and does so even if there has been a fault and a transition to relative mode during a previous operation. If the fault still exists when the movable member 1 is set in motion, the correspondence test 18 then reveals this fault again.

According to the preferred embodiment described in FIG. 2, a particular and optional processing of this case is proposed in dashed lines. This optional processing uses the preserved in memory of the faults D from one startup to the other in the faults log D. Specifically it is sufficient to consult the faults log D stored in non-volatile memory in order to know that a transition to relative mode 17 has taken place during the previous operation.

According to this optional processing, when the data CAM_POS and STP_POS are available, the motor is in normal mode 12'. In this normal mode 12', the correspondence test, marked 18', is supplemented by a consultation 19 of the transitions to relative mode 17 and of the faults D stored in the memory MEM. The consultation 19 is initiated when the correspondence test 18' is negative (case N).

According to the optional processing, when a transition to relative mode 17 has been stored in the faults log (case O), a calibration step 15 is carried out during which at least one complete revolution of the movable member 1 is completed during which parameters of the modifications of the state of the fixed member 2 are recorded. On the other hand, when the faults log D contains no transition to relative mode 17, a simple verification step 13 is carried out.

Note finally that various applications may be achieved according to the principles of the invention. In particular, various uses of the faults log may be applied in addition to the invention or in combination with it, as illustrated in the optional processing proposed above, without excluding such embodiments from the scope of the invention defined in the following claims.

The invention claimed is:

1. A method for controlling the angular position [STP_POS] of a stopless rotatably movable member [1] of a stepper motor, the movable member [1] being able to interact with at least one fixed member [2] and a state of the fixed member [2] modifiable during the rotation of the movable member [1] according to the parameters [CAM_POS] previously defined according to the angular position [STP_POS] of the movable member [1], the method comprising the steps of:
   associating each angular position [STP_POS] of the movable member [1] with a state of the fixed member [2] to define the parameters [CAM_POS];
   testing the correspondence [18] of the state of the fixed member [2] with the parameters [CAM_POS] of the predefined modifications, in a mode in which the position of the motor [STP_POS] is considered to be defined; and
   comparing the state of the fixed member [2] according to the parameters [CAM_POS] previously defined according to the position [STP_POS] of the movable member [1] to determine an output of the correspondence test [18].

2. A method according to claim 1, characterized in that it also comprises a verification step [13], initiated when the correspondence test [18] is negative, during which at least one complete revolution of the movable member [1] is completed in order to verify the occurrence of the modification of the state of the fixed member [2] according to the parameters [CAM_POS] previously defined according to the position [STP_POS] of the movable member [1].

3. A method according to claim 2, characterized in that it also comprises a step of deciding to place motor in a normal mode [12] when the correspondence test [18] is positive or when the verification [13] is correct or in a relative mode [17] in which the position [STP_POS] of the movable member [1] is determined relative to the position in which it is at the end of the verification step when the verification [13] is incorrect.

4. A method according to claim 3, characterized in that it also comprises a step of signaling the transition to relative mode [17] on a man-machine interface.

5. A method according to one of claims 3 and 4, characterized in that it also comprises a step of recording [20], in a non-volatile memory [MEM], a fault [D] with which is associated the decision to pass to relative mode [17] and the result of the verification step [13].

6. A method according to claim 5, characterized in that the result of the verification step [13] makes it possible to distinguish a fault [D] due to the fixed member [2] from a fault [D] due to the movable member [1].

7. A method according to claim 5, characterized in that, in normal mode [12], when the correspondence test [18'] is negative, the method also comprises a step [19] of consulting the recorded faults [D] followed either by a calibration step [15], during which at least one complete revolution of the movable member [1] is completed during which parameters [CAM_POS] of the modification of the state of the fixed member [2] are recorded, when a decision to switch to relative mode [17] is recorded in the non-volatile memory [MEM], or a verification step [13] otherwise.

8. A method according to claim 6, characterized in that, in relative mode [17], it includes a step of receiving a request for the deletion of the result of the verification step [13] stipulating a fault of the movable member [1], a step of deleting the fault of the movable member [1] from the non-volatile memory [MEM], this deletion step causing the initiation of a calibration step [15], during which at least one complete revolution of the movable member [1] is completed during which parameters [CAM-POS] of the modification of the state of the fixed member [2] are recorded.

9. A method according to claim 6, characterized in that, in relative mode [17], it includes a step of receiving a request for the deletion of the result of the verification step [13] stipulating a fault of the fixed member [2], a step of deleting the fault of the fixed member [2] from the non-volatile memory [MEM], this deletion step causing the initiation of a calibration step [15] or of a verification step [13] depending on whether or not a record of a fault [D] of the movable member [1] is present.

10. A method according to claim 1, characterized in that the parameters [CAM_POS] of the modifications of the state of the fixed member [2] are previously defined in a previous calibration step [15] during which at least one complete revolution of the movable member [1] is completed during which parameters [CAM_POS] of the modifications of the state of the fixed member [2] are recorded.

11. A method according to claim 1, characterized in that it includes a step of receiving an external request to initiate a calibration step [15], during which at least one complete revolution of the movable member [1] is completed during which parameters [CAM_POS] of the modification of the state of the fixed member [2] are recorded.

12. A method according to claim 1, characterized in that the correspondence test [18] is run when a modification of the state of the fixed member [2] is expected in view of the predefined parameters [CAM_POS] or when the motor is stopped.

13. A method according to claim 1, characterized in that the parameters of the modifications [CAM_POS] of the state of the fixed member [2] are such that they make it possible to define the direction of rotation of the movable member [1].

14. A method according to claim 1, characterized in that, the state of the fixed member [2] being able to be modified between two states, the parameters of the modifications include, with reference to the angular origin, numbers of steps [Cam11, Cam21] or percentages of the circumference corresponding to at least two modification from the first state to the second state, the number of steps [Cam12, Cam22] or the percentages of the circumference corresponding to at least two modifications from the second state to the first state, modifications due to the presence of at least two cams [5, 6] of a length in number of different steps on the movable member [1].

15. A stepper motor comprising a control unit [8], a motor block [7], and characterized in that it comprises a stopless rotatably movable member [1] able to interact with at least one fixed member [2] with a state of the fixed member [2] modifiable during the rotation of the movable member [1], and the control unit [8] is able to use the method according to claim 1.

16. A stepper motor according to claim 15, characterized in that the rotatably movable member [1] supports two cams [5, 6] of different sizes in number of steps of the motor.

17. A stepper motor according to one of claims 15 and 16, characterized in that the fixed member [2] is a pushbutton contactor.

18. A motor vehicle fitted with a device for actuating a ventilation/air conditioning shutter comprising a stepper motor according to claim 17.

19. A computer program comprising code instructions for the execution of the steps of the position control method when the program is run by the control unit [8] of the stepper motor according to claim 15.

20. An information medium on which is recorded a computer program comprising code instructions of executing the steps of the position control method according to claim 19.

* * * * *